United States Patent
Wiegel

(10) Patent No.: US 11,898,810 B2
(45) Date of Patent: Feb. 13, 2024

(54) HYBRID THERMAL TRANSFER PANEL

(71) Applicant: J. Parr Wiegel, Pittsford, NY (US)

(72) Inventor: J. Parr Wiegel, Pittsford, NY (US)

( * ) Notice: Subject to any disclaimer, the term of this patent is extended or adjusted under 35 U.S.C. 154(b) by 68 days.

(21) Appl. No.: 17/460,769

(22) Filed: Aug. 30, 2021

(65) Prior Publication Data

US 2023/0067812 A1 Mar. 2, 2023

(51) Int. Cl.
 *F28F 3/12* (2006.01)

(52) U.S. Cl.
 CPC ...................... *F28F 3/12* (2013.01)

(58) Field of Classification Search
 CPC ...... F28F 3/12; F28F 21/06; F28F 9/12; F28F 2275/18; F28F 2275/14; F28F 2275/08; F28F 2275/085
 USPC .......................................................... 248/510
 See application file for complete search history.

(56) References Cited

U.S. PATENT DOCUMENTS

| | | | | |
|---|---|---|---|---|
| 4,766,885 A * | 8/1988 | Muramatsu | ............ | F24S 10/753 165/104.21 |
| 7,212,002 B2 * | 5/2007 | Greim | .................. | G01R 33/341 324/318 |
| 2004/0150271 A1 * | 8/2004 | Koga | ................ | H05K 7/20927 310/64 |
| 2010/0168296 A1 * | 7/2010 | Lee | .......................... | C08L 69/00 524/127 |
| 2016/0049705 A1 * | 2/2016 | Mahe | ........................ | F28F 3/10 29/890.03 |
| 2019/0109357 A1 * | 4/2019 | Kenney | ..................... | F28F 3/12 |

FOREIGN PATENT DOCUMENTS

| | | | | |
|---|---|---|---|---|
| CN | 110106993 A | | 8/2019 | |
| JP | 02238223 A | * | 9/1990 | ............ F24D 3/142 |
| JP | 2020-165242 A | | 10/2020 | |
| KR | 20030040279 A | | 5/2003 | |
| KR | 10-1039317 B1 | | 6/2011 | |
| KR | 10-1371142 B1 | | 3/2014 | |

OTHER PUBLICATIONS

International Search Report and Written Opinion of the International Searching Authority in corresponding International Application No. PCT/US2022/042053; dated Dec. 16, 2022.

* cited by examiner

*Primary Examiner* — Tho V Duong
(74) *Attorney, Agent, or Firm* — Brian B. Shaw, Esq.; Harter Secrest & Emery LLP

(57) ABSTRACT

A thermal transfer panel is provided for transferring thermal energy to or from an ambient environment. The thermal transfer panel includes a thermal radiating plate having a plurality of spaced elongate tabs and a thermal insulating plate having a plurality of elongate grooves. The thermal transfer panel is coupled to the thermal insulating plate to form a fluid flow channel. The tabs can include a plurality of apertures, wherein the thermal insulating plate is coupled to the thermal radiating plate, by a bonding agent or a portion of the thermal insulating plate being flowed into the apertures of the tabs so as to retain the thermal insulating plate relative to the thermal radiating plate. Couplers are provided for connecting the thermal transfer panels by fluidly connecting the fluid flow channels of one thermal transfer panel to the fluid flow channels of another thermal transfer panel, or a manifold, or a fluid distribution system.

17 Claims, 7 Drawing Sheets

HYBRID THERMAL TRANSFER PANEL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

The present disclosure relates generally to a system that utilizes a thermally conditioned fluid, such as a heated fluid (water, glycol, antifreeze or other liquid or combination) to impart heat transfer into or out of an internal or external structure such as subfloor, floor, roof, outdoor patio or driveway section. More specifically, the present disclosure is directed to thermal transfer panel having a thermal radiating plate of a first thermal conductivity and a thermal insulating plate of second thermal conductivity, wherein the first thermal conductivity is greater than the second first thermal conductivity. The thermal radiating plate is coupled, such as bonded, to the thermal insulating plate to define at least one fluid flow channel therebetween. Couplers can be selectively engaged with the fluid flow channel to fluidly connect fluid flow channels within a given thermal transfer panel or fluid flow channels of separate thermal transfer panels. The thermal transfer panel thus provides for a thermally conditioned fluid, such as heated liquid (water, glycol, antifreeze or other liquid or mixture) to be used in heating the inside of a home, apartment, building, shed or other structure including but not limited to floors, walls and roofs in an efficient manner.

DESCRIPTION OF RELATED ART

There are many areas within a home, building, shed or other structures where heating can take place in a more efficient manner than is provided by conventional systems. Forced air and baseboard heat are two examples of conventional systems. By increasing the efficiencies of heating delivery systems to a home, building, shed or other structures with a radiant heating panel there is a significant reduction in fuel usage, thereby significantly abating fuel costs, pollution created by burning fossil fuels and other natural resources. Additionally, reducing fuel costs may directly impact energy costs by reducing demand and increasing supply.

One area of a home, building, shed or other structures that operates inefficiently is a forced air heating system. The very best forced air systems are 85% efficient as the heat source and lost heat in the wall or floor transfers some of the heat which is then pushed into a room or other space creating a circular airflow which further cools the air and reduces efficiency.

Another area of the home, building, shed or other structures that heats inefficiently is baseboard heating, while radiant heating is efficient, base boards are limited in size output. In addition, baseboard heat tends to heat only the area directly above the heat source creating hot and cold spots within a room or space.

What is needed is a radiant thermal transfer panel system that will heat the entire floor, or wall of a room or space offering a very accurate and consistent heating system eliminating hot and cold spots and reducing fuel usage.

BRIEF SUMMARY OF THE INVENTION

Generally, the present disclosure provides a thermal transfer panel having a thermal insulating plate having a first thermal conductivity; and a thermal radiating plate having a second thermal conductivity, the second thermal conductivity being greater than the first thermal conductivity; wherein the thermal insulating plate and the thermal radiating plate are coupled together to define a channel therebetween for conducting a fluid.

The present disclosure further provides a thermal transfer panel having a thermal insulating plate having a first thermal conductivity, the thermal insulating plate including a first groove defined by a first pair of projecting flanges and a second groove defined by a second pair of projecting flanges; and a thermal radiating plate having a second thermal conductivity, the second thermal conductivity being greater than the first thermal conductivity, the thermal radiating plate having a first tab located within the first groove and a second tab located within the second groove to define a channel between the thermal insulating plate and the thermal radiating plate.

The present disclosure also provides a thermal transfer panel having a thermal insulating plate having a first thermal conductivity and a thermal radiating plate having a second thermal conductivity, the second thermal conductivity being greater than the first thermal conductivity, and wherein a fluid flow channel extends between the thermal insulating plate and the thermal radiating plate to define an inlet port and an outlet port and further wherein the thermal conductivity of the thermal radiating plate is at least twice the thermal conductivity of the thermal insulating plate.

A method is disclosed including the steps of providing a thermal insulating plate having a first thermal conductivity, providing a thermal radiating plate having a second thermal conductivity, the second thermal conductivity being greater than the first thermal conductivity, and connecting the thermal insulating plate to the thermal radiating plate to define a fluid flow channel therebetween for conducting a fluid. A further method provides using the thermal transfer panel for heating or cooling, such as by passing a first thermally conditioned fluid such as heated water, through a first subset of the fluid flow channels and a second thermally conditioned fluid such as chilled gas or liquid, through a different subset of the fluid flow channels.

BRIEF DESCRIPTION OF THE SEVERAL VIEWS OF THE DRAWING(S)

DETAILED DESCRIPTION OF THE INVENTION

Figure 1:
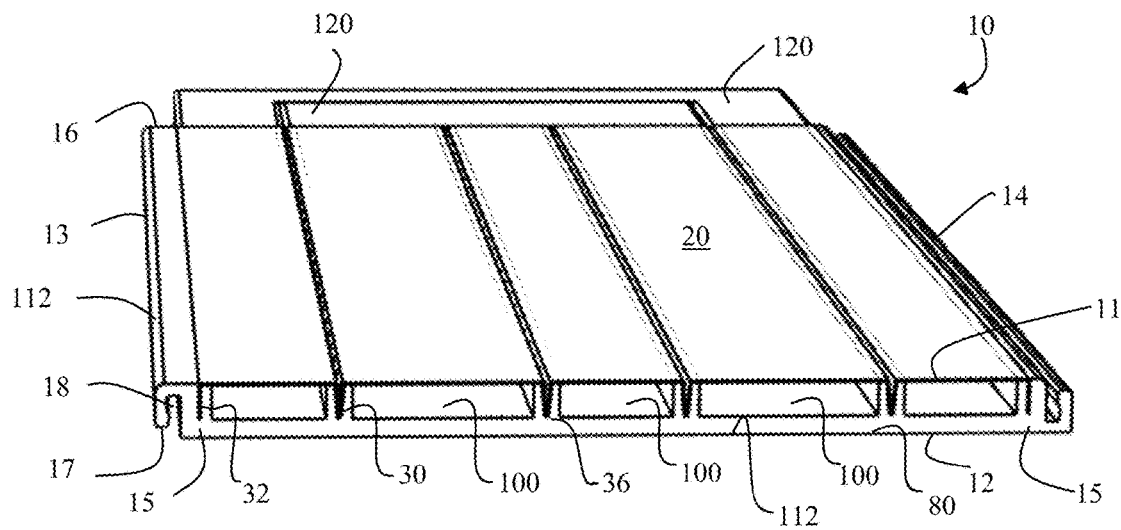
FIG. 1 is a perspective view of a thermal transfer panels with couplers interconnected fluid flow channels of the thermal transfer panel.
Figure 2:
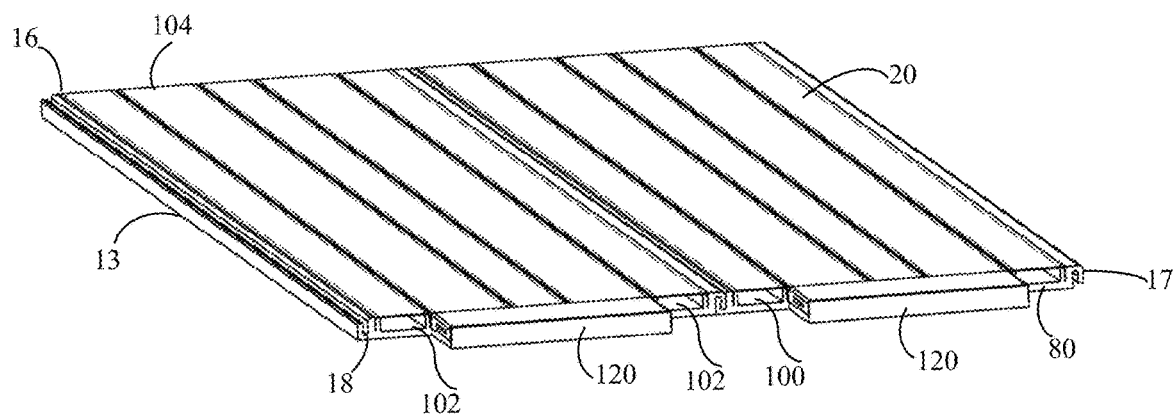
FIG. 2 is a perspective view of a pair of interconnected thermal transfer panels, each thermal transfer panel having a coupler connecting fluid flow channels of the thermal transfer panel.
Figure 3:
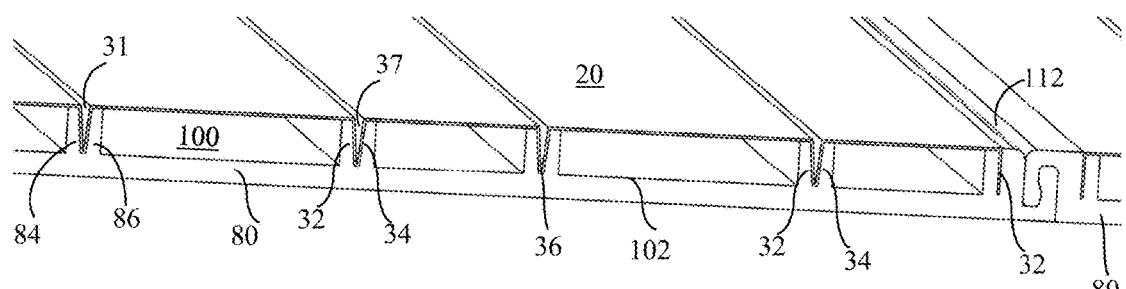
FIG. 3 is a perspective view of a portion of a first thermal transfer panel engaged with a second thermal transfer panel.
Figure 4:
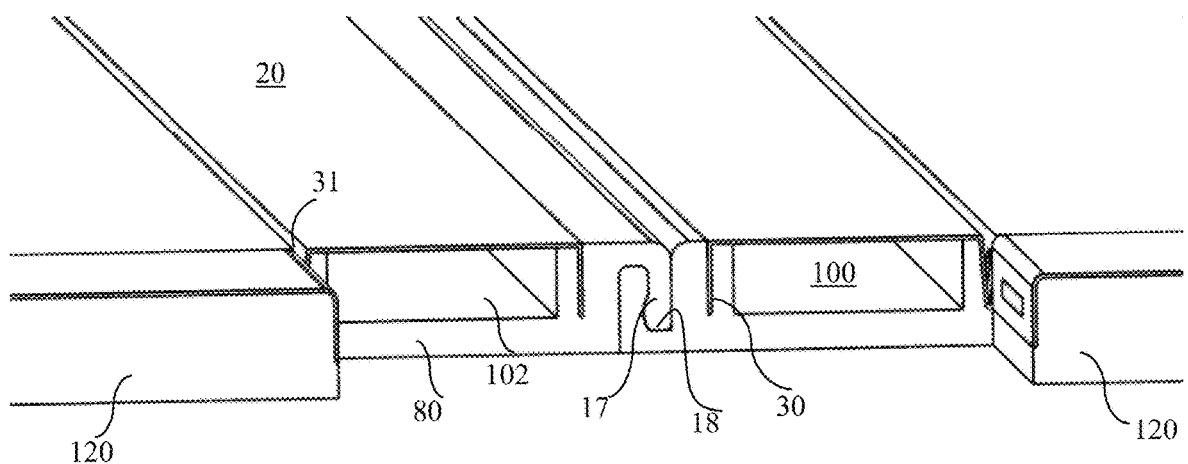
FIG. 4 is an enlarged perspective view of a first thermal transfer panel engaged with a second thermal transfer panel.

The present disclosure provides a thermal transfer panel 10, wherein the thermal transfer panel can be operably located in a home, a building, a shed or other structure to function as a heat source or a heat sink. It understood the thermal transfer panel 10 can be warmer than the surrounding environment thereby acting as a heat source and transferring heat to the surrounding environment or the thermal transfer panel can be cooler than the surrounding environment acting as a heat sink and transferring heat from the surrounding environment. For purposes of description, the thermal transfer panel 10 is set forth in terms of acting as a heat source, but it is understood the present description is applicable to the thermal transfer panel functioning as a heat sink. Further, it is understood the thermal transfer panel 10 can be operably deployed in a home, building, shed or other structure as well as outdoor installations such as driveways or walk ways. For purposes of convenience, the thermal transfer panel 10 is referred to as being operably located in a house, but this is not limiting in the operable location of the thermal transfer panel. The thermal transfer panels 10 heat up and retain heat so once the thermal transfer panel is relatively hot, the panel will continue to heat the floor longer, in contrast to air or wood.

Referring to FIGS. 1-4, the thermal transfer panel 10 includes a thermal radiating plate 20 and a thermal insulating plate 80 between which at least one fluid flow channel 100 is defined. The thermal radiating plate 20 has a first thermal conductivity and the thermal insulating plate 80 has a second thermal conductivity, wherein the first thermal conductivity is greater than the second thermal conductivity. The thermal conductivity is the ability of a material to conduct heat, and it represents the quantity of thermal energy that flows per unit time through a unit area with a temperature gradient of 1° per unit distance. As set forth below, the thermal radiating plate 20 can be formed of metal such as a galvanized metal including galvanized steel and thus can have a thermal conductivity of approximately 50 (W/m K), while the thermal insulating plate 80 can be formed of a polymeric material such as polyurethane and can thus have a thermal conductivity of approximately 0.02 (W/m K). It is contemplated the thermal insulating plate 80 will have a thermal conductivity of less than 10 (W/m K), and in certain configurations less than 5 (W/m K), and in further configurations less than 1 (W/m K). In contrast, the thermal radiating plate 20 can have a thermal conductivity of at least 20 (W/m K), and in certain configurations, such as galvanized steel, greater than at least 50 (W/m K), and in further configurations greater than at least 100 (W/m K). Thus, the thermal conductivity of the thermal radiating plate 20 is at least twice the thermal conductivity of the thermal insulating plate 80, and in some configurations the thermal conductivity of the thermal radiating plate 20 is at least ten times the thermal conductivity of the thermal insulating plate 80, and in further configurations as much as one hundred times the thermal conductivity of the thermal insulating plate, and in further configurations at least 1,000 to 5,000 or more times the thermal conductivity of the thermal insulating plate.

In one configuration, the thermal transfer plate 20 is modified B deck structural roofing deck. The thermal transfer plate 20 can thus be a metal, such as galvanized metal, thus providing ready thermal transfer to the surrounding environment. In one configuration, the thermal transfer plate 20 can be formed of a galvanized steel (metal) B deck having a plurality of longitudinally extending tabs 30 (and corresponding longitudinal recesses 31) on approximately 6-inch centers with the tabs have a height of approximately 0.5 inches to approximately 1 ½ inches. However, it is recognized the tabs 30 can be configured such that the thermal transfer panel has an overall thickness from approximately 0.5 inches to as many as 3 to 4 inches. In one configuration, the thermal transfer panel 10 and thermal radiating plate 20 can be of uniform thickness. However, it is contemplated the thermal transfer panel 10 (and at least one of the thermal radiating plate 20 and the thermal insulating plate 80) can have a different thickness in different locations. In further configurations, the thermal transfer plate 20 can be formed of alternative oxidation resistant materials with relatively high thermal conductivity such as, but not limited to aluminum, copper, as well as alloys such as stainless steel, bronze, and brass.

The thermal radiating plate 20 is sealingly coupled to the thermal insulating plate 80. The coupling of the thermal radiating plate 20 to the thermal insulating plate 80 can define or at least partly define the fluid flow channel 100. That is, the fluid flow channel 100 can be entirely defined by the thermal radiating plate 20 and the thermal insulating plate 80, or the fluid flow channel can be at least partly defined by the thermal radiating plate and the thermal insulating plate, wherein an intermediate filler or bonding material defines a portion of the fluid flow channel. In one configuration, the thermal radiating plate 20 is sealingly coupled to the thermal insulating plate 80 by a bonding material or a plurality of fasteners 110, wherein the fasteners are integral with the thermal insulating plate 80. Thus, the term fastener includes mechanical fasteners, such as but not limited to bolts and screws as well as adhesive bonding, deformation or welding of the thermal insulating plate 80 to the thermal radiating plate 20.

As set forth below, in one configuration, the thermal radiating plate 20 is metal and the thermal insulating plate 80 is polymeric, wherein the fastener 110 is a bonding material or the plastic deformation of a portion of the thermal insulating plate which couples to a portion of the thermal radiating plate. For purposes of description, the configuration of the thermal radiating plate 20 being metal and the thermal insulating plate 80 being polymeric is set forth. That is, the bonding material may operatively coupled the thermal radiating plate 20 to the thermal insulating plate 80 or at least a portion of the thermal insulating plate can be plastically deformed without plastically deforming the thermal radiating plate. In the plastic deformation, which deformation will continue as long as the forces are applied, the material gives the impression of flowing under the applied loads at temperature, and this flow is plastic, since, when the load is removed, the material retains the imparted deformation. As set forth below, the plastic deformation can be imparted by a combination of temperature and pressure, wherein the temperature and pressure for imparting plastic deformation are outside the anticipated operating temperature and pressure, and thus the thermal transfer panel 10 will retain an intended shape in operation.

Alternatively, as set forth below, the thermal radiating plate 20 can be coupled to the thermal insulating plate 80 by the bonding material, wherein the bonding material forms a water tight seal between the plates.

The polymer material of the thermal insulating plate 80 can include thermoplastics, thermoplastic elastomers, and thermosets, as well as epoxy, urethane, polyurethane and Methyl Methacrylate, or MMA resins, wherein the polymer material can include at least one of a flame-retardant additive and a flame-retardant fillers. Flame retardant fillers can include brominated flame retardants, chlorinated, flame retardants, chlorinated paraffins flame retardants, such as chlorinated paraffins and chlorinated alkyl phosphate as well as organophosphorus flame retardants and melamine flame retardants. It is also contemplated the thermal insulating plate 80 can be formed of other materials and composites such as, but not limited to polyvinyl chloride (PVC) or fiberglass composites.

The thermal transfer panel 10 includes a top side or surface 11, a bottom surface 12, and a periphery, wherein in one configuration, the periphery includes parallel peripheral edges 13, 14 and transverse parallel ends 15, 16 and the fluid flow channel 100 opens to the ends of the thermal transfer panel. In one configuration, a first end defines a first port 102 to the fluid flow channel 100 and a second end of the thermal transfer panel defines a second port 104 to the fluid flow channel. It is contemplated the first port and the second port can be located at a terminal end of the fluid flow channel 100 along the peripheral edge or at least one of the top surface 11 and the bottom surface 12.

For purposes of description, the fluid flow channels 100 are set forth as extending along a longitudinal direction, thus having a longitudinal dimension, wherein the fluid flow channels are parallel to each other. However, it is understood the fluid flow channels 100 can be curvilinear, faceted. Further, while the fluid flow channels 100 are shown as having a constant cross section along the longitudinal direction, it is contemplated the fluid flow channels can be formed of varying cross section along the longitudinal dimension. Although the fluid flow channels 100 can follow a curvilinear path, however, for manufacturing purposes it has been found advantageous to form the fluid flow channels as linear extending along the longitudinal direction between the edges 15, 16 of the thermal transfer panel 10. As seen in the Figs., the fluid flow channels 100 can have the first port 102 and the second port 104 at respective ends of the thermal transfer panel 10. Further, it is contemplated that the plurality of fluid flow channels 100 in the thermal transfer panel 10 can be of different sizes or cross sectional areas. In addition, it is contemplated that only a subset of the plurality of fluid flow channels 100 may conduct the temperature controlled fluid.

Further, the fluid flow channels 100 can have different cross sectional areas. That is, the plurality of fluid flow channels 100 can include a first subset having a first cross sectional area and a second subset having a different second cross sectional area.

As seen in Figs., the edges 15, 16 of the thermal transfer panel 10 include a tongue 17 and a correspondingly sized groove 18, wherein the tongue of a first panel is cooperatively received withing the groove of a second panel, thereby mechanically connecting the first thermal transfer panel and the second thermal transfer panel 10. While the tongue 17 and groove 18 are shown as extending continuously along the respective edge of the thermal transfer panel, it is understood the tongue and groove can be intermittent or gapped thereby reducing the material used in the thermal transfer panel. In one configuration, the tongue 17 and groove 18 do not form any portion of the fluid flow channel 100.

A plurality of thermal transfer panels 10 can also be mechanically and operably connected to together by couplers 120. The couplers 120 are connection devices that make both a structural connection and a fluid connection between the fluid flow channels 100 of adjacent thermal transfer panels 10, thereby holding the thermal transfer panels together and allowing the thermally conditioned fluid to transfer between thermal transfer panels.

Figure 5:
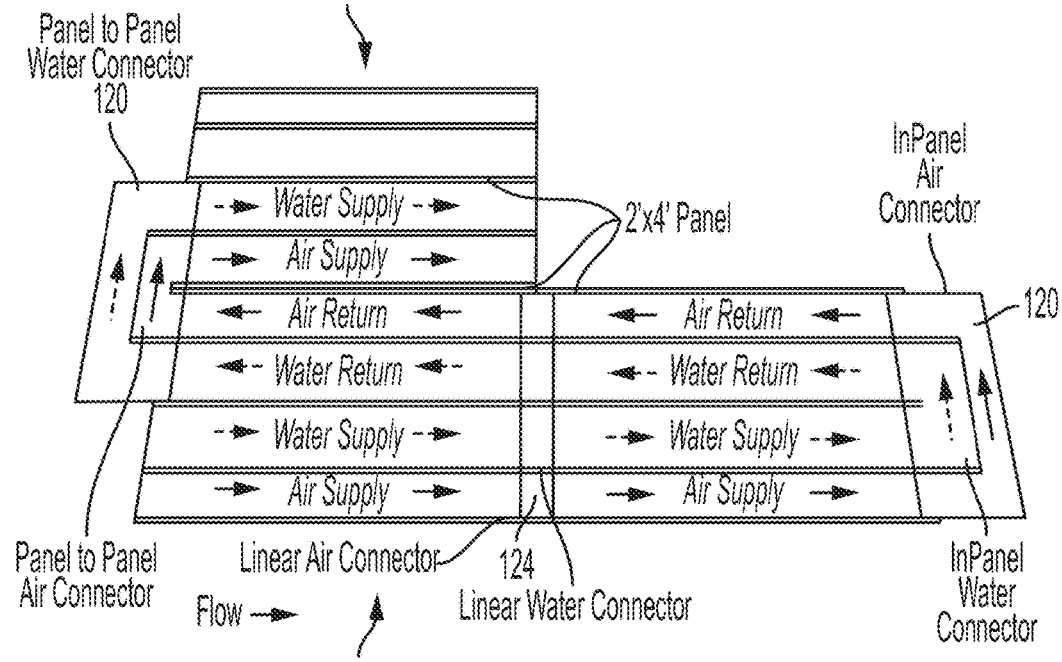
FIG. 5 is a schematic of a plurality of coupler configurations for the thermal transfer panels.
Figure 6:
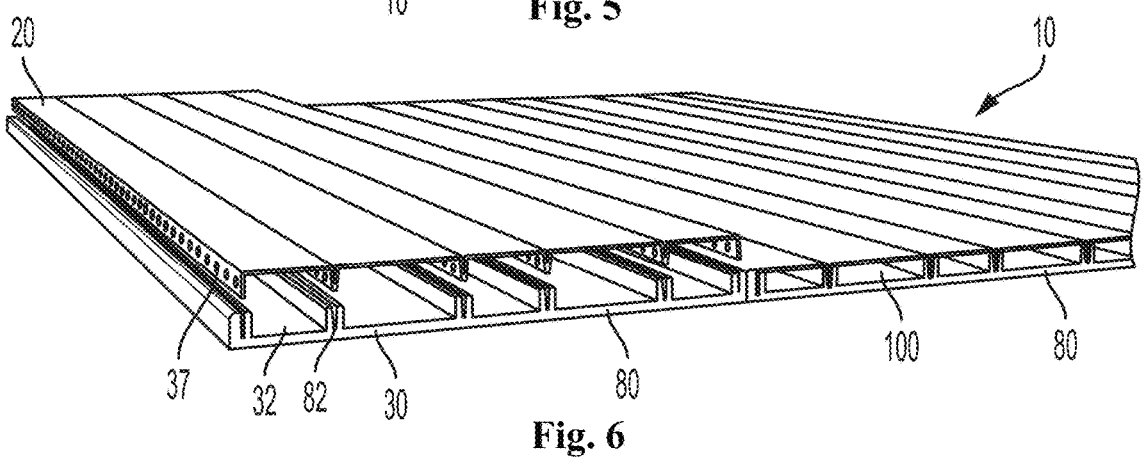
FIG. 6 is a perspective view of an assembled and exploded thermal radiating plate and thermal Insulating plate of the thermal transfer panel.
Figure 7:
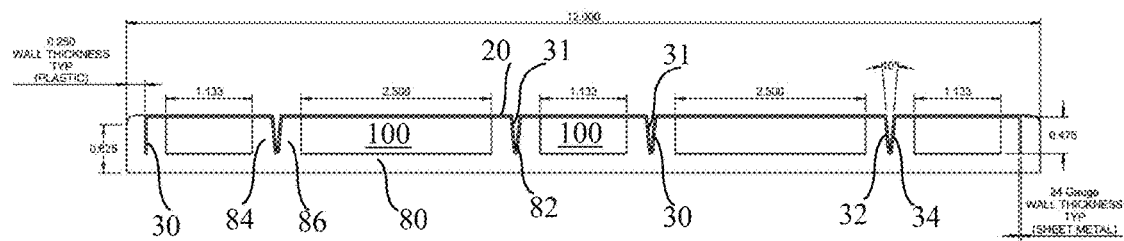
FIG. 7 is a cross sectional view of the thermal transfer panel showing representative dimensions.
Figure 8:
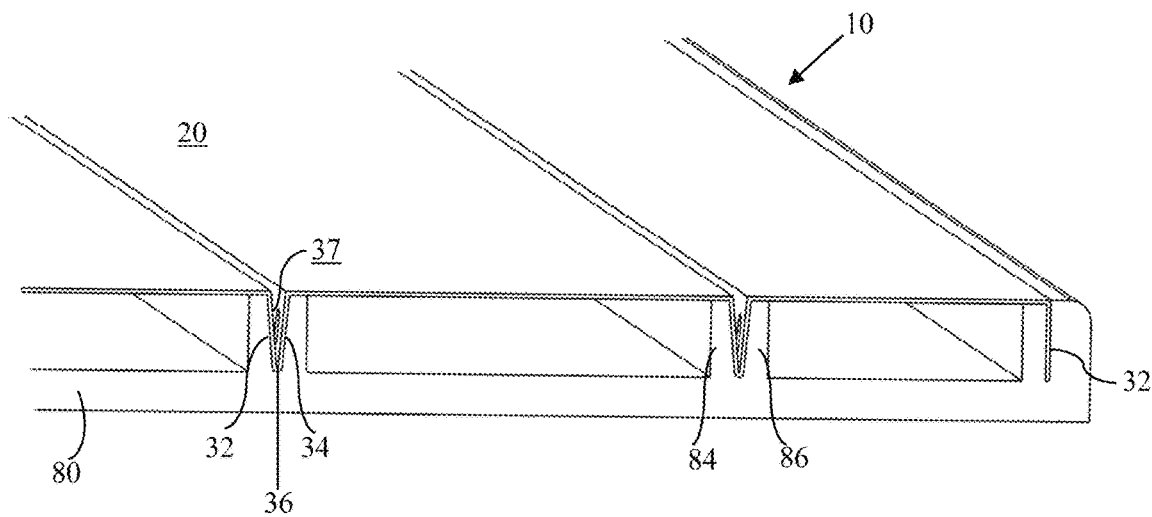
FIG. 8 is an enlarged perspective view of an end of the thermal transfer panel showing the thermal radiating plates and the thermal insulating plate.
Figure 9:
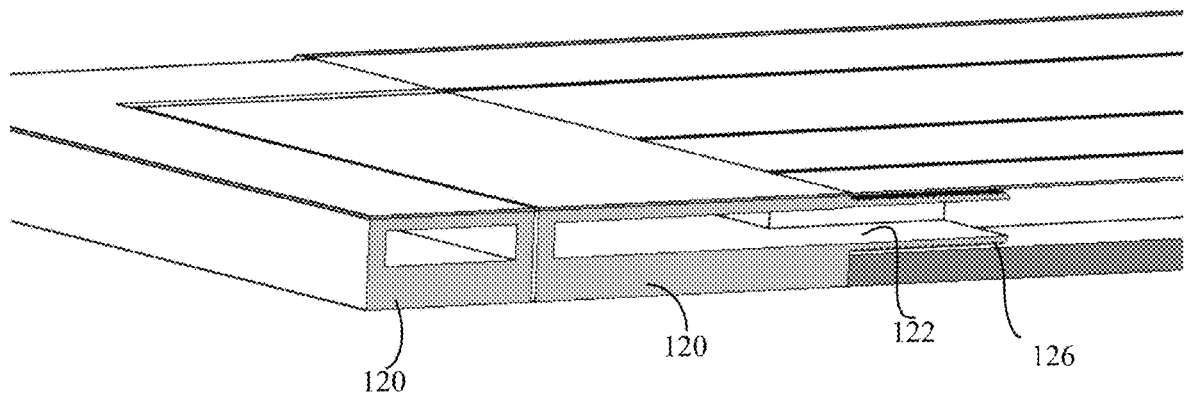
FIG. 9 is a perspective cross sectional view of a coupler connected to the thermal transfer plate.
Figure 10:
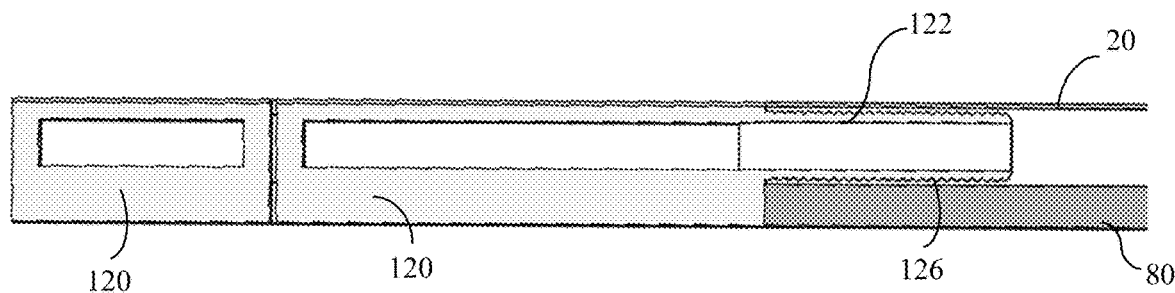
FIG. 10 is an alternative perspective cross sectional view of a coupler connected to the thermal transfer plate.
Figure 11:
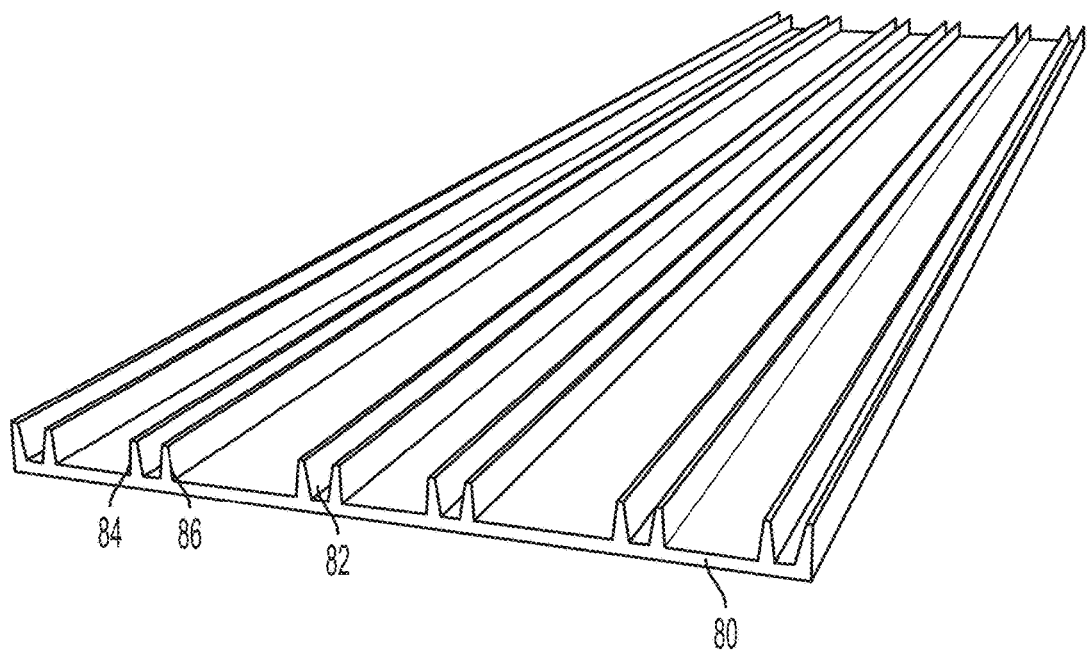
FIG. 11 is a perspective view of one configuration of the thermal insulating plate.
Figure 12:
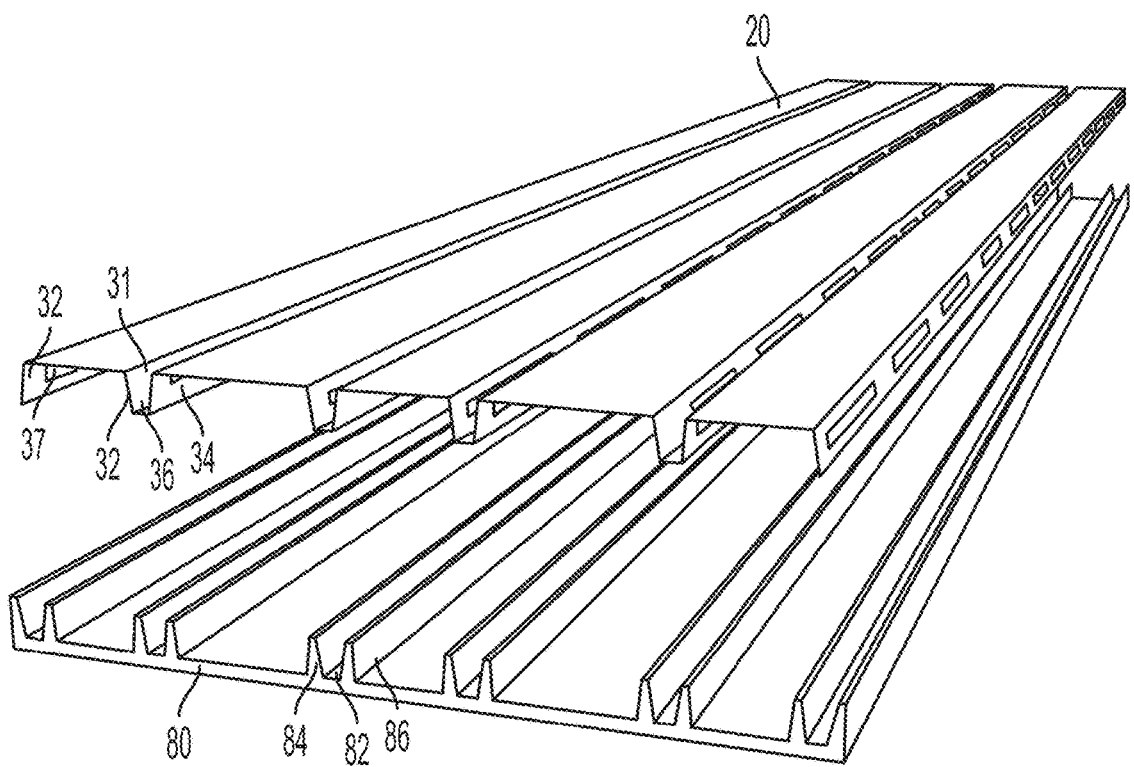
FIG. 12 is an exploded perspective view of a first configuration of the thermal radiating plate and the thermal insulating plate prior to assembly.
Figure 13:
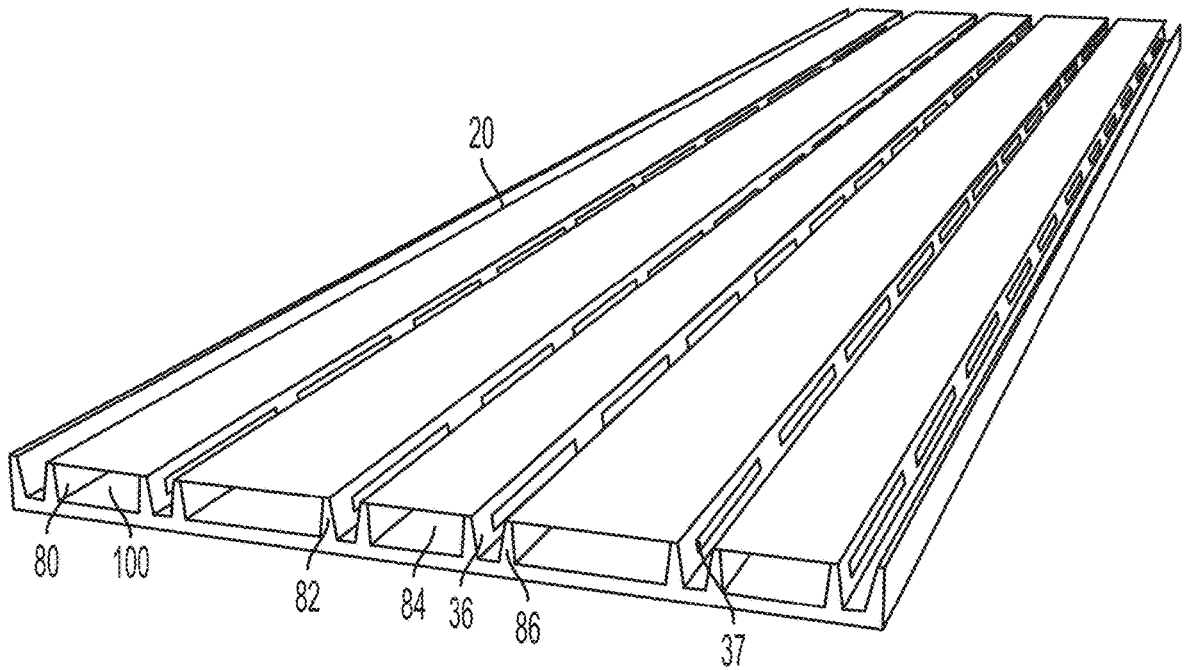
FIG. 13 is a perspective view of the first configuration of the thermal radiating plate and the thermal insulating plate of FIG. 12 in an assembled configuration.
Figure 14:
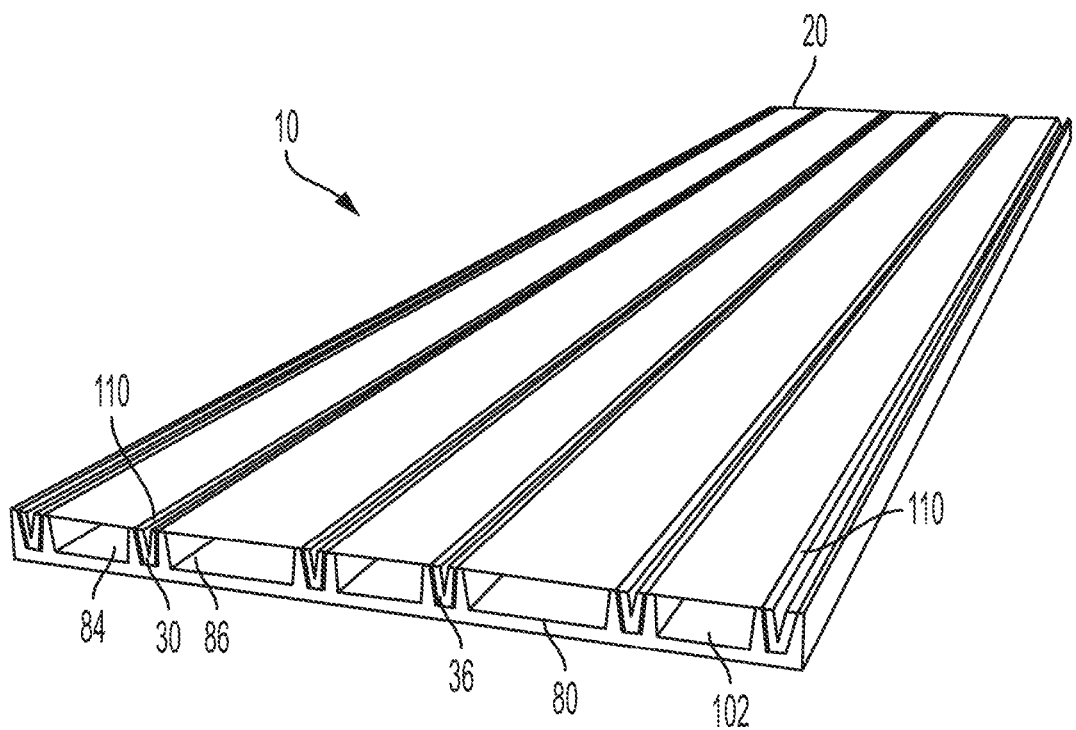
FIG. 14 is a perspective view of the assembled first configuration of the thermal radiating plate and the thermal insulating plate of FIG. 13 in a sealed configuration.

Referring to FIGS. 9 and 10, in one configuration, the couplers 120 include a pair of opposing insertion portions 122 separated by a medial stop 124 (FIG. 5). In certain configurations, the couplers 120 are formed without the medial stop. The insertion portions 122 include a plurality of spaced ribs or fingers 126 the engage the thermal radiating plate 20 and the thermal insulating plate 80 to form a sealed interface. In one configuration, the fingers 126 are inclined toward the medial stop 124 so as to be resistive to an extraction force, while allow insertion with a reduced force. The medial stop 124 also functions to provide an indicator of the coupler 120 being operably seated, or inserted. The medial stop 124 can be on the order of ⅛ inch to 2-3 three inches, thereby spacing adjacent thermal transfer panels at a predetermined separation.

The couplers 120 can alternatively have one insertion portion and a fitting for engaging tubing to deliver liquid to or from the respective fluid flow channel. Thus, the coupler 120 can include a first end having engaging surfaces for mechanically and sealingly engaging the thermal transfer panel 10 and a second end for operably connecting to a commercially available line such as, but not limited to standard industry PEX tubing in one configuration or another thermal transfer panel in a second configuration. In a further configuration, it is contemplated the coupler 120 can be structured to function as a plug, forming a cap at an end of a fluid flow channel.

Referring to FIG. 5, the couplers 120 can be configured to connect two thermal transfer panels 10 in an end to end orientation, wherein the couplers align the respective fluid flow channels 100 between the two panels. The couplers 120 can also be configured to join the fluid flow channels of two panels that are in a side-by-side orientation. In this configuration, the couplers 120 are generally U-shaped and the insertion portions are connected by a transverse leg of the coupler. In a further configuration, the coupler 120 can interconnect the fluid flow channels of a given thermal transfer panel, thus routing a fluid from a first end of the panel along a first fluid flow channel 100 to the second end of the panel and then back through a second fluid flow channel 100 from the second end of the panel to the first end of the panel.

In one configuration, the thermal radiating plate 20 is the top side of the thermal transfer panel 10 and thus defines the top surface 11. The thermal radiating plate 20 generally extends in a plane and includes the plurality of projecting tabs 30 extending away from the plane. In one configuration, the tabs 30 are formed by corrugations, folds or pleats in the thermal radiating plate 20. The tabs 30 can be defined by a single leg 32 or a pair of legs 32, 34 intersecting at an apex 36. As seen in the Figs., the apex 36 can be defined by a radius and the legs 32, 34 diverge from the apex towards the plane of the thermal radiating plate 20.

As seen in FIGS. 1, 2, 3, 4, and 6-8, one of the tabs 30 can form a first edge of the thermal radiating plate 20 and a second tab 30 forms a second edge of the thermal radiating plate. The tabs 30 at the edges of the thermal radiating plate can be formed as the single leg 32 projecting from the plane of the thermal radiating plate.

In the configuration of the thermal radiating plate 20 formed of a folded, corrugated or shaped sheet the projecting legs 32, 34 of the projecting tab 30 form a corresponding longitudinally extending recess 31 exposed to the plane of the plate. As seen in Figs., the recess opens 31 to the plane of the thermal radiating plate 20 and has a depth defined by the closed end apex 36 of the tab 30, such as the intersection of the legs 32, 34.

Figure 15:
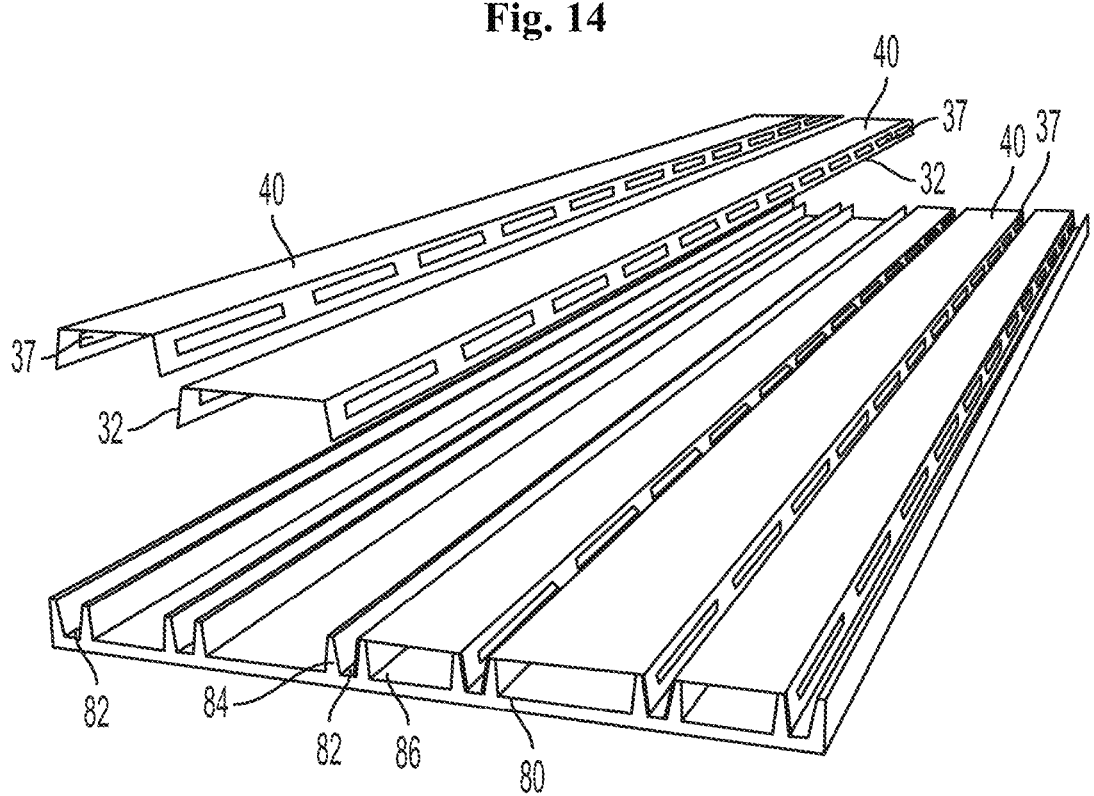
FIG. 15 is an exploded perspective view of a second or segmented configuration of the thermal radiating plate and the thermal insulating plate prior to assembly.
Figure 16:
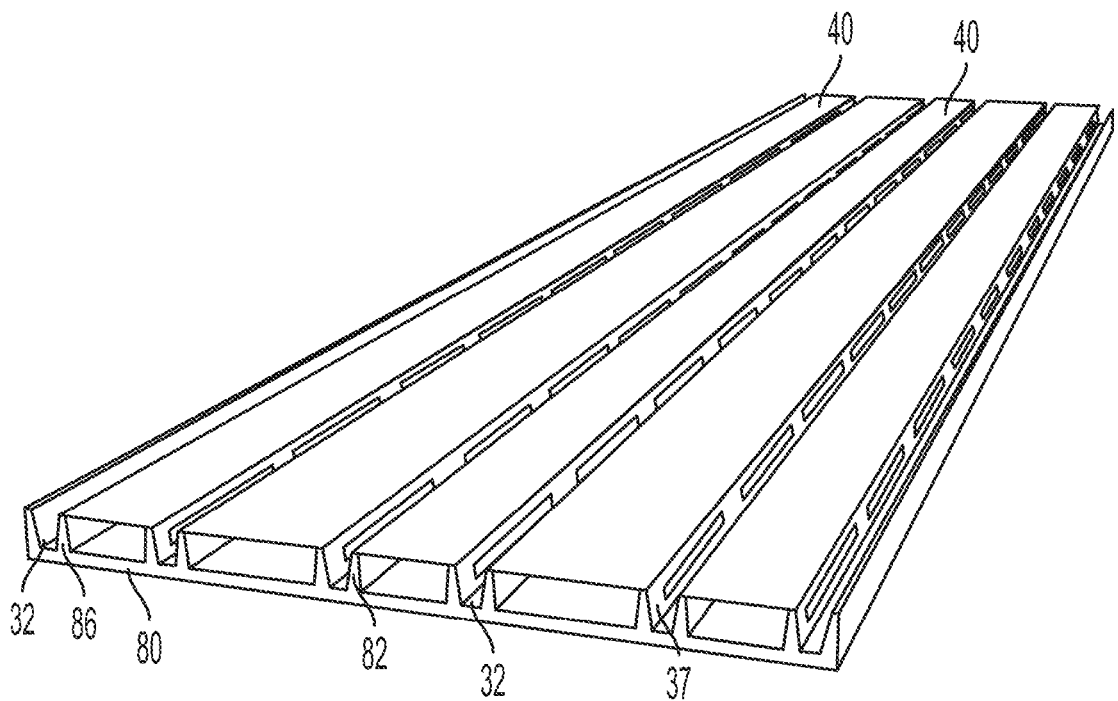
FIG. 16 is a perspective view of the second configuration of the thermal radiating plate and the thermal insulating plate of FIG. 15 in an assembled configuration.
Figure 17:
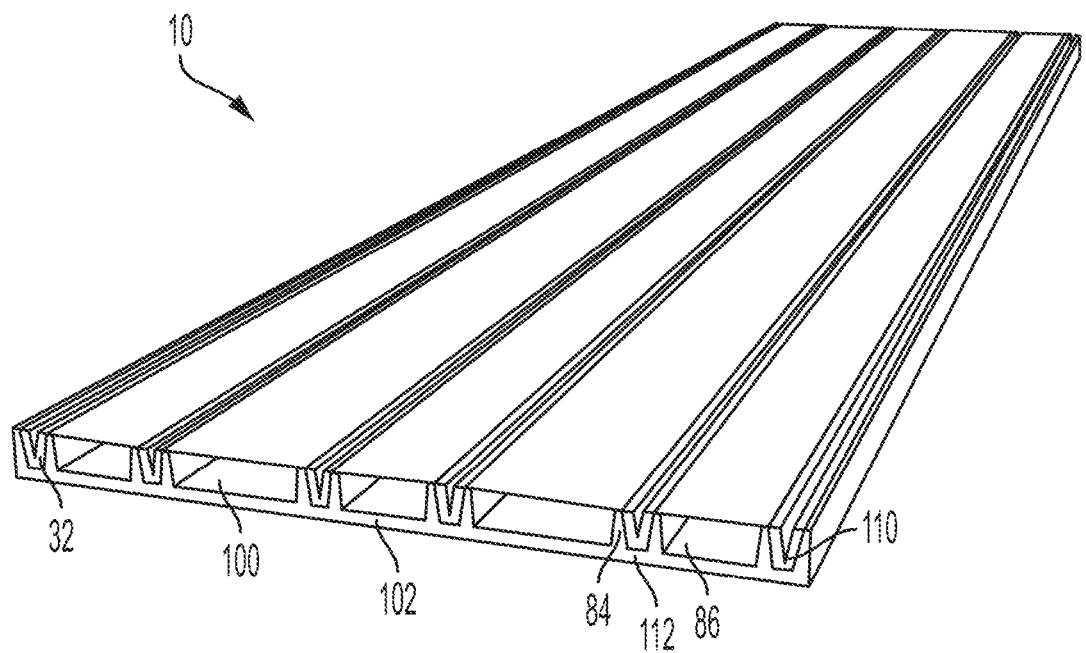
FIG. 17 is a perspective view of the assembled second configuration of the thermal radiating plate and the thermal insulating plate of FIG. 15 in a sealed configuration.

In a further configuration, shown in FIGS. 15-17, the thermal radiating plate 20 can be constructed of a plurality of segments 40, wherein each segment includes a first tab 30 extending along one longitudinal edge of the segment and a second tab 30 extending along a second longitudinal edge of the segment, and each tab includes a single leg 32, such that the leg from each edge of the segment is disposed within a corresponding groove 82 of the thermal insulating plate 80.

Each of the legs 32, 34 can includes a plurality of apertures 37 extending along the longitudinal dimension and spaced between the plane of the thermal radiating plate 20 and a terminal end of the tab 30. Each of the apertures 37 can be the same size, of the apertures can be of varying sizes along the longitudinal dimension or a vertical dimension, perpendicular to the plane of the thermal radiating plate 20 and thus in the vertical direction, or dimension.

Referring to FIGS. 13-17, the tabs 30 of the thermal radiating plate 20 are receiving within corresponding grooves 82 of the thermal insulating plate 80. In one configuration, the plurality of grooves 82 of the thermal insulating plate 80 are formed by adjacent projecting flanges 84, 86. The flanges 84, 86 extend along the longitudinal dimension of the thermal insulating plate 80 and defining the groove 82 sized to receive a corresponding portion of the corresponding tab 30 of the thermal radiating panel 20.

As seen in at least FIGS. 1, 3, 6-8 and 11-17, the grooves 82 can have a converging cross section configured to receive the diverging portion of the tabs 30 of the thermal radiating plate 20.

In one configuration, the thermal radiating plate 20 is coupled to the thermal insulating plate 80 to define the fluid flow channels 100 by flowing a portion of the material of the thermal insulating plate through the apertures 37 in the tabs 30 or introducing a bonding material into the exposed recess 31 of the tabs. The bonding material can include a curing or hardening composite such as epoxy, silicone, cyanoacrylate and UV cure adhesive systems from MasterBond Inc.

The tabs 30 of the thermal transfer plate 20 cooperate with the bonding material 110 or the material of the thermal insulating plate 80 to operably secure the thermal transfer plate to the thermal insulating plate. As set forth above, in one configuration, the tabs 30 or the legs 32, 34 of the tabs include a series of apertures 37 for receiving the bonding material or the material of the thermal insulating plate 80. The series of apertures 37 can extend in a single line or parallel lines along the longitudinal dimension of the tabs 30. Depending on the method of manufacture, it is understood the apertures 37 can be linearly aligned or offset along the longitudinal direction. The number, shape and spacing of the apertures 37 is determined in conjunction with the material of the thermal insulating plate 80 (or the bonding material 110) to provide that upon operable coupling of the thermal transfer plate 20 and the thermal insulating plate 80, the resulting fluid flow channels 100 are sealed along the longitudinal dimension. That is, the thermal insulating plate 80 (or the bonding material) to provide that upon operable coupling of the thermal radiating plate 20 and the thermal insulating plate 80 are sealingly connected.

The fluid flow channels 100 are thus at least partly defined by the thermal transfer plate 20 and the thermal insulating plate 80 as the thermal transfer plate is coupled to the thermal insulating plate. It is contemplated the fluid flow channel 100 can be any of a variety of cross-sectional profiles including but not limited to faceted, curvilinear, oval, obround, square, rectangular or circular. The fluid flow channels 100 can be symmetrical or non-symmetrical relative to a longitudinal axis of the fluid flow channel or relative to a transverse direction to the longitudinal axis. That is, while the fluid flow channel 100 can have a constant cross sectional area along the longitudinal axis, the fluid flow channel can vary from circular or square, for example 2 inch diameter or dimension to a relative flat channel having a thickness of between 0.25 inches and one inch, thereby defining an area parallel to the top or bottom surface of the panel that can be between approximately 8-10 inches to 3 to 4 inches in width. It is believed that by providing relatively large surface areas parallel to the top surface 22 of the thermal transfer plate 20 that heat transfer between the thermal transfer panel 10 and the surrounding environment can be enhanced. In one configuration, the fluid flow channels 100 are configured to minimize resistance to flow, thereby providing for low pump requirements for circulation. In one representative configuration, the fluid flow channel 100 has a constant cross section along the longitudinal dimension, except at the ports, of an approximately 2 inch width and approximately 2 inch height. However, it is understood that certain portions of the fluid flow channel 100 may have different cross sections and hence different resistance to flow.

It is contemplated that in one configuration, at least a portion of the top and/or the bottom surface of the thermal transfer panel 10 includes indicia or markings 112 indicating the location of at least one of the fluid flow channel 100. The indicia 112 allow an installer to locate a fastening or nailing area, where fasteners can penetrate the thermal transfer panel 10 and engage a supporting structure such as a joist, rafter or stud, without intersecting the fluid flow channel. The indicia 112 can include recesses or depressions, typically on the order of 0.1 inch of less. In a further configuration, the indicia can include a textured, painted or embossed surface. It is further contemplated that the thermal transfer panel 10 can include or cooperate a nail fin (nailing fin or mounting flange) (not shown) extending along at least one longitudinal edge of the panel. The nail fin can be used to affix the thermal transfer panel 10 relative to the building structure, or can be used to temporarily located the thermal transfer panel relative to the building. That is, after installation and interconnection of a plurality of thermal transfer panels 10, the nailing fin can be removed, thereby allowing the interconnected panels to float relative to the building structure so as to provide accommodation for thermal expansion and contraction from differing coefficients of thermal expansion.

In one configuration, the bottom surface of the thermal insulating plate 80 is designed to fit on and engage a floor or roof joist or stud, particularly as such joists are used to support a sub floor or sub roof. The thermal transfer panel 10 can be any of a variety of sizes, such as but not limited to 1'×4' or 2'×4' or 4'×4' as well as 4'×8. It is understood the thermal transfer panel 10 is not limited to these sizes, to a maximum size of 4'×8'. In one configuration, the bottom surface of the thermal insulating plate 80 is planar, thereby providing for seating atop a plurality of structural supports, such as joists or rafters. In a further configuration, the bottom surface of the thermal insulating plate 80 defines at least one external trough or depression for receiving a structural building element. Thus, the thermal transfer panel 10 will replace the sub floor or sub roof. For example, if the thermal transfer panel 10 is to operably engage a typical 2×6; 2×8, 2×10 or 2×12 floor joist, as the joist has a nominal thickness of approximately 1.5 inches, then the trough in the bottom surface of the thermal insulating plate 80 has a width of approximately 1.5 to 1.6 inches to receive the joist. The depth of the trough can be between approximately ⅛ inch to one inch, though the depth of the trough is not limiting.

Thus, in one configuration, the thermal radiating plate 20 is operably coupled to the thermal insulating plate 80 by the fasteners 110, wherein the fasteners are formed by the plastic deformation of at least one of the thermal radiating plate, the thermal insulating plate or the bonding material 110. As set forth above, either of the thermal transfer plate 20 and the thermal insulating plate 80 can be polymeric, however for purpose of description and without limited the disclosure, the thermal radiating plate 20 is set forth as metal and the thermal insulating plate is set forth as polymeric. Thus, the thermal insulating plate 80 can plastically deform without the thermal radiating plate 20 plasticly deforming.

In one method to form the thermal transfer plate 20, the thermal radiating plate is formed from a piece of sheet metal such as by roll forming, bending or shaping. The thermal insulating plate 80 is extruded through a die to provide the cross section of the plate, including the grooves 82.

The tabs 30 of the thermal radiating plate 20 are then disposed within the grooves 82 of the thermal insulating plate 80, and the plates are heated to a temperature to provide plastic deformation of the thermal insulating plate. The thermal radiating plate 20 is pressed against the thermal insulating plate 80 to impart plastic deformation of the thermal insulating plate 80 through the apertures 37 of the tabs 30 of the thermal radiating plate 20. Pressure can be applied to applied across the thermal radiating plate 20 or along the recesses 31. As the pressure is applied to the thermal radiating plate 20, the thermal insulating plate 80, and particularly the surface of the thermal insulating plate exposed to the apertures of the thermal radiating plate deforms to pass material of the thermal insulating plate through the apertures, thereby forming the fasteners.

Alternatively, once the tabs 30 of the thermal radiating plate 20 are then disposed within the grooves 82 of the thermal insulating plate 80, the bonding material can be disposed within the recesses 31 of the thermal radiating plate. The bonding material 110 passes through the apertures 37 in the legs 32, 34 of the tabs 30 and can bond to both the thermal insulating plate 80 as well as the thermal radiating plate. Upon cure or hardening of the bonding material 110, the thermal radiating plate 20 is sealingly coupled to the thermal insulating plate 80 and the respective fluid flow channels 100 are formed.

Thus, in one configuration, the fasteners 110 can be integral with the thermal insulating plate 80, as the fasteners are formed of the material of the thermal insulating plate. By deforming the material of the thermal insulating plate 80 through the apertures 37 of the thermal radiating plate 20, the thermal radiating plate and the thermal insulating plate are sealingly engaged to form the fluid flow channels 100.

As the materials cool, harden, or cure, the thermal insulating plate 80 is sealingly coupled to the thermal radiating plate 20 and the fluid flow channels 100 are formed. The formed thermal transfer panel 10 can then be installed or sized, such as by cutting, for installation.

As set forth above, each end of the fluid flow channel 100 includes the ports defining a fluid flow channel interface for operably receiving the coupler 120, wherein the coupler fluidly connects to the fluid flow channel interface of a second thermal transfer panel, thereby operably fluidly interconnecting the thermal transfer panels. Depending on the specific configuration of the installation, a given port 102, 104 can be a return port or an inlet port. The port 102, 104 can be located along a periphery edge of the thermal transfer panel 10 or at one of the major planar faces of the panel or at the ends of the thermal transfer panel. Further, as set forth below the ports 102, 104 can be located at adjacent or opposing peripheral edges or walls of the thermal transfer panel 10. It is also contemplated the ports 102, 104 may be located along a common peripheral edge of the thermal transfer panel 10.

While the figures disclose the configuration wherein the couplers 120 mechanically connect adjacent thermal transfer panels 10, it is contemplated that alternative types of interconnection can be employed for joining the coupler to the thermal transfer panel as well as adjacent thermal transfer panels, such as bonding including cements and bonding agents or welding such as ultrasonic welding. It is further contemplated that the thermal transfer panels 10 can be formed by insert injection molding as well as over molding.

In use, it is thus contemplated that a method is provided including passing a first temperature controlled fluid through a first fluid flow channel 100 and a second fluid flow channel 100 in the thermal transfer panel 10, wherein the first fluid flow channel and the second fluid flow channel are defined by a thermal insulating plate 80 and a thermal radiating plate 20; and selectively passing a second temperature controlled fluid through a third fluid flow channel 100 defined by the thermal insulating plate and the thermal radiating plate. It is understood the second temperature controlled fluid can be a gas and the first temperature controlled fluid can be a liquid. For example, the first temperature controlled fluid can be a liquid such as water or a water mix which is heated by heat source such as but no limited to a building heater, furnace or hot water supply. The second temperature controlled fluid can be a gas, such as an air conditioned or cooled air. Thus, the thermal transfer panel 10 can be used to selective heat or cool the local environment, such as by removing or introducing heat to the local environment. However, it is understood the heating and cooling can be accomplished with the thermal transfer panel 10 by passing heated water, liquid, through a first subset of the fluid flow channels 100 and chilled water, liquid, through a different subset of the fluid flow channels. Alternatively, heated air, gas, can be passed through the first subset of fluid flow channels 100 and a cooled air, gas, can be passed through the second subset of the fluid flow channels. It is understood any combination of liquid or gas can be used in combination for heating or cooling.

As seen in the Figs. and particularly FIG. 5, the couplers 120 and the ports of the thermal transfer panel 10 can be cooperatively configured to provide operable interconnection. Thus, the coupler 120 can function as a fluid connection into/out of the thermal transfer panel 10, a mechanical connection between thermal transfer panels as well as termination of fluid flow channels 100. In one configuration, an exterior surface of the coupler 120 and a corresponding surface of the ports 102, 104 include mating surface features such as but not limited to ridges—grooves, concave portion—convex portions as well as threaded surfaces. These allow the coupler 120 to be operably engaged with the port and hence thermal transfer panel 10 so as to provide the intended fluid, structural or fluid and structural connection. It is further contemplated that adhesives, bonding agents as well as welding or ultrasonic welding can be used to connect the coupler 120 to the thermal transfer panel 10. It is further contemplated that the couplers 120 can be connected to the thermal transfer panels 10 by insert injection molding as well as over molding.

In addition, the port 102, 104 (and hence the coupler 120) can have a different cross sectional profile than the remainder of the fluid flow channel 100. For example, the coupler 120 and ports can have a curvilinear or circular cross section while the fluid flow channel 100 has a faceted or rectangular cross section. However, it is understood the coupler 120 and port can have a faceted or rectangular cross section while the fluid flow channel 100 has a curvilinear or circular cross section.

In one configuration, the thermal transfer panel 10 is placed on the floor joist and a second thermal transfer panel (not shown) is fluidly connected to the first thermal transfer panel through the couplers 120, wherein the couplers allow liquid flow between the thermal transfer panels 10. Once the room or space is completed, a manifold (not shown) provides the fluid distribution and return to and from the connected thermal transfer panels 10 to the thermal conditioning system, heating system, allowing the entire grouping of the thermal transfer panels to become a highly efficient complete heating system.

In one configuration, the thermal insulating plate 80 is formed of a material that can accommodate a separate fastener, such as a nail or screw that can be used to secure the thermal transfer panel 10 to a structural element. Thus, the separate fastener passes through the thermal transfer panel to retain the thermal transfer panel relative to the structural building element.

This disclosure has been described in detail with particular reference to an embodiment, but it will be understood that variations and modifications can be effected within the spirit and scope of the disclosure. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A thermal transfer panel comprising:
   (a) a thermal insulating plate having a first thermal conductivity; and
   (b) a thermal radiating plate having a second thermal conductivity, the second thermal conductivity being greater than the first thermal conductivity;
   wherein the thermal insulating plate and the thermal radiating plate are coupled together to at least partly define a fluid flow channel therebetween,
   wherein one of the thermal insulating plate and the thermal radiating plate includes a first groove and a spaced second groove and a remaining one of the thermal insulating plate and the thermal radiating plate includes a first tab at least partly disposed within the first groove and a second tab at least partly disposed within the second groove,
   wherein the first groove comprises a first projecting flange and a spaced second projecting flange.

2. The thermal transfer panel of claim 1, wherein the thermal insulating plate is polymeric and includes at least one of a flame-retardant additive and a flame-retardant filler.

3. The thermal transfer panel of claim 1, wherein the thermal insulating plate is polymeric.

4. The thermal transfer panel of claim 1, wherein the thermal radiating plate is metal.

5. The thermal transfer panel of claim 1, wherein the first tab comprises a first leg and a second leg joined at an apex, wherein the apex is received within the first groove.

6. The thermal transfer panel of claim 1, wherein a portion of the thermal insulating plate is disposed within the first tab.

7. The thermal transfer panel of claim 1, wherein the first tab comprises a first leg and a second leg joined at an apex, wherein the apex is received within the first groove, and each of the first leg and the second leg has a plurality of apertures.

8. A thermal transfer panel comprising:
   (a) a thermal insulating plate having a first thermal conductivity, the thermal insulating plate including a first groove defined by a first pair of projecting flanges and a second groove defined by a second pair of projecting flanges; and
   (b) a thermal radiating plate having a second thermal conductivity, the second thermal conductivity being greater than the first thermal conductivity, the thermal radiating plate having a first tab located within the first groove and a second tab located within the second groove wherein a fluid flow channel extends between the thermal insulating plate and the thermal radiating plate.

9. The thermal transfer panel of claim 8, wherein the thermal insulating plate is polymeric.

10. The thermal transfer panel of claim 8, wherein the thermal radiating plate is metal.

11. The thermal transfer panel of claim 8, wherein the thermal radiating plate comprises a first corrugation.

12. The thermal transfer panel of claim 8, wherein the thermal radiating plate comprises a second corrugation.

13. The thermal transfer panel of claim 8, wherein the first tab includes a first plurality of apertures and the second tab includes a second plurality of apertures, wherein a first portion of the thermal insulating plate extends through the first plurality of apertures and a second portion of the thermal insulating plate extends through the first plurality of apertures.

14. The thermal transfer panel of claim 8, wherein the thermal insulating plate is polymeric and includes at least one of a reactive flame-retardant and an additive flame-retardant.

15. The thermal transfer panel of claim 8, wherein the first pair of projecting flanges and the second pair of projecting flanges are integral with the thermal insulating plate.

16. The thermal transfer panel of claim 8, wherein the first tab comprises a first corrugation and the first corrugation comprises a first leg and a second leg joined at an apex, wherein the apex is received within the first groove.

17. The thermal transfer panel of claim 8, wherein the first tab comprises a first corrugation and wherein the first corrugation comprises a first leg and a second leg joined at an apex, wherein the apex is received within the first groove and a portion of the thermal insulating plate extends between the first leg and the second leg.

\* \* \* \* \*